United States Patent [19]

Komatsu

[11] Patent Number: 5,691,820
[45] Date of Patent: Nov. 25, 1997

[54] DATA COMMUNICATION SYSTEM AND FACSIMILE MACHINE IN THE DATA COMMUNICATION SYSTEM

[75] Inventor: Masao Komatsu, Kawasaki, Japan

[73] Assignee: Fujitsu Limited, Kanagawa, Japan

[21] Appl. No.: 260,064

[22] Filed: Jun. 15, 1994

[30] Foreign Application Priority Data

Oct. 4, 1993 [JP] Japan .................. 5-247270

[51] Int. Cl.$^6$ ................ H04N 1/36; H04N 1/41; H04N 1/00
[52] U.S. Cl. ............ 358/434; 358/409; 358/431; 358/439; 375/358; 371/32
[58] Field of Search ............... 358/404, 406, 358/407, 409, 412, 431, 433, 434, 435, 436, 438, 439, 442, 261.1, 261.3, 261.4; 379/100; 370/465, 470, 476, 528; 375/358, 363, 373, 377; 371/32, 33, 34

[56] References Cited

U.S. PATENT DOCUMENTS

| | | | |
|---|---|---|---|
| 4,586,088 | 4/1986 | Kondo | 358/431 |
| 4,661,857 | 4/1987 | Kondo | 358/431 |
| 4,719,514 | 1/1988 | Kurahayashi et al. | 358/439 |
| 4,775,893 | 10/1988 | Ishikawa | 358/261.1 |
| 4,947,268 | 8/1990 | Nakajiri et al. | 358/261.1 |
| 5,198,908 | 3/1993 | Kurosawa | 358/442 |
| 5,289,582 | 2/1994 | Hirata et al. | 358/400 |
| 5,301,274 | 4/1994 | Li | 395/250 |
| 5,387,983 | 2/1995 | Sugiura et al. | 358/434 |

Primary Examiner—Edward L. Coles, Sr.
Assistant Examiner—Kimberly A. Williams
Attorney, Agent, or Firm—Helfgott & Karas, P.C.

[57] ABSTRACT

A facsimile communication system includes a transmitter for transmitting data in a state where a minimum value of a total amount of data to be transmitted for each scanning line is secured, the data for each block including image data, and a receiver for receiving the data transmitted from the transmitter. The receiver has a memory for storing the image data out of the data received for each scanning line by the receiver, a printer unit for performing a printing process using the image data read out from the memory, a checking unit for determining, based on an amount of image data which has not been used for printing yet and remains in the memory, whether or not the minimum value of the total amount of data to be transmitted for each scanning line can be changed, and a signal output unit, when the checking unit determines that the minimum value of the total amount of data to be transmitted for each scanning line can be changed, for outputting a request signal, the request signal being transmitted to the transmitter. The transmitter has a detecting unit for detecting the request signal from the receiver, and changing means, when the detecting unit detects the request signal, for changing the minimum value of the total amount of data to be transmitted for each scanning line, so that the data is transmitted in a state where a changed minimum value of the total amount of data to be transmitted for each scanning line is secured.

38 Claims, 8 Drawing Sheets

AMOUNT OF DATA
FOR LINE $L_1$ ---- N1 BITS (SMALL)

AMOUNT OF DATA
FOR LINE $L_2$ ---- N2 BITS (LARGE)

$M_1$ : CURRENT ADDRESS OF IMAGE DATA NOT USED $M_0$ : CURRENT ADDRESS OF IMAGE DATA USED LAST

DATA COMMUNICATION SYSTEM AND FACSIMILE MACHINE IN THE DATA COMMUNICATION SYSTEM

BACKGROUND OF THE INVENTION

(1) Field of the Invention

The present invention generally relates to a data communication system, such as a facsimile communication system, and a data transmission apparatus (e.g. a facsimile machine) provided in the data communication system.

(2) Description of the Related Art

Recently, for example, facsimile machines which carry out image data communication have been popularized. Transmission rates of the image data at which the image data can be transmitted between the facsimile machines are defined so as to fall within a predetermined range corresponding to a standard and specifications of the facsimile machines. Before actual transmission of the image data, a transmission rate in the above range is determined between the facsimile machines by transmitting commands in accordance with a protocol. In this case, due to the limitation of the printing speed in a receiver side facsimile machine, a minimum amount of data which can be transmitted as data for one scanning line may be determined. Even if an amount of image data greater than the minimum amount of data is transmitted line by line to the receiver side facsimile machine, all the image data for each line is not printed before the image data for the next line is received. As a result, the image data is collected in the receiver side facsimile machine. The minimum amount of data for each line corresponds to a minimum time which must be taken to transmit the image data for each scanning line. This minimum time is referred to as a minimum transmission time.

In a conventional facsimile communication system having, for example, G3 facsimile machines which are most popular, the minimum transmission time is defined.

In a transmitter side facsimile, a document on which images are formed as shown in FIG. 1A is scanned in a lateral direction (a main scanning direction) so that the images are read line by line. Signals for successive scanning lines are coded into digital codes (e.g. run length), and the digital codes are successively transmitted, as signals for successive lines, to a receiver side facsimile. In the receiver side facsimile which receives the signals for respective lines, the received signals are temporarily stored in a buffer and the signals read out from the buffer are printed on a recording sheet moved line by line. Thus, in the operation of the receiver side facsimile machine, a minimum time is required for mechanical operations by which the image is printed and the recording sheet is moved line by line. This minimum time depends on properties (e.g. the capacity of the buffer and the printing speed). of the receiver side facsimile machine. The minimum transmission time T0 is determined based on this minimum time. The minimum transmission time corresponds to the minimum amount of data which can be transmitted as data for each scanning line.

In FIG. 1A, a scanning line L1 crosses a single line, so that an amount of image data obtained from the scanning line L1 is small. In this case, the amount of image data is represented by N1 as shown in FIG. 1B. The amount N1 of image data is less than the amount of data corresponding to the minimum transmission time T0. Thus, fill bits "0" are added to the image data so that the total amount of data for the scanning line L1 is equal to the amount of data corresponding to the minimum transmission time T0. A code EOL representing the end of data is positioned at the end of data for each scanning line. On the other hand, in a case of a scanning line L2 shown in FIG. 1A, since the image crossed by the scanning line L2 is complex, an amount N2 of image data for the scanning line L2 is greater than the amount of data corresponding to the minimum transmission time T0. In this case, no fill bit "0" are added to the image data as shown in FIG. 1C, so that the image data for the scanning line L2 to which the code EOL is added at the end thereof is transmitted as it is.

The image data communication between the transmitter side facsimile machine (hereinafter referred to as a transmitter) and the receiver side facsimile machine (hereinafter referred to as a receiver) is carried out as shown in FIG. 2. FIG. 2 shows a typical operation sequence in the facsimile communication. Referring to FIG. 2, first, a DIS command (an identification signal representing functions of the receiver) is transmitted from the receiver. At this time, the receiver also transmits information indicating the value of the minimum transmission time T0 (e.g. 10 ms., 20 ms. or 40 msec.) to the transmitter. After the transmitter receives the value of the minimum transmission time T0, the value of the transmission time T0 is set in the transmitter. After this, a DSC command (indicating that function of the receiver have been set) is transmitted from the transmitter to the receiver in response to the DIS command.

Next, the transmission rate (phase) is adjusted between modems of the transmitter and the receiver by using training signals, and when a CFR command (indicating that the receiving preparation has been completed) is transmitted from the receiver to the transmitter, the transmitter starts to transmit image data. In a case where the transmitter is a facsimile machine in which while a document being scanned, and coded image data is transmitted line by line, an amount of coded image data for each scanning line is checked. If the amount of the image data for a scanning line is less than the amount of data corresponding to the minimum transmission time T0 set in the transmitter, redundancy data (the fill bits) are added to the image data, as shown in FIG. 1B, so that data of which total amount (length) reaches a predetermined amount (corresponding to the minimum transmission time T0) is obtained. This data obtained by addition of the redundancy data is transmitted, as data for the scanning line, to the receiver. The data transmission is being carried out line by line until an EOP (representing the end of a page) is transmitted from the transmitter. After the value of the minimum transmission time T0 is set in a procedure before transmission of image data, the value of the minimum transmission time is not changed until the transmission of image data for one page is completed.

As has been described above, in a case where image information of a document oh which an amount of data for each scanning line is very small is transmitted, the number of fill bits to be added to the image data for each line is large if the minimum transmission time T0 is set at a large value. As a result, a communication time wasted on transmission of the fill bits is increased.

To decrease the minimum transmission time, the printing speed, and/or the capacity of a memory in which the received image data is stored must be increased. For example, after image information for an entire page is stored in the memory, the printing operation for the image information for the page may start.

However, the printing speed is actually limited to a value, and the mechanism in which images are printed at a high printing speed is expensive. In addition, to increase the capacity of the memory, such as to store image information for an entire page, the memory is enlarged such as an auxiliary storage unit (e.g. hard disk unit) and the cost for the memory is increased.

SUMMARY OF THE INVENTION

Accordingly, a general object of the present invention is to provide a novel and useful data communication system in which the disadvantages of the aforementioned prior art are eliminated.

A more specific object of the present invention is to provide a data communication system in which waste fill bits can be prevented from being added to image data for each scanning line without increasing the capacity of the memory provided in a receiver.

The above objects of the present invention are achieved by a data communication system comprising: a transmitter for transmitting data in a state where a minimum value of a total amount of data to be transmitted for each block is secured, the data for each block including effective data; and a receiver, operatively connected to the transmitter, for receiving the data transmitted from the transmitter, the receiver having: storage means for storing the effective data out of the data received for each block by the receiver; processing means for processing the effective data read out from the storage means; determination means for determining, based on an amount of effective data which has not yet been processed and remains in the storage means, whether or not the minimum value of the total amount of data to be transmitted for each block can be changed; and signal output means, when the determination means determines that the minimum value of the total amount of data to be transmitted for each block can be changed, for outputting a request signal, the request signal being transmitted to the transmitter, the transmitter comprising: detecting means for detecting the request signal from the receiver; and changing means, when the detecting means detects the request signal, for changing the minimum value of the total amount of data to be transmitted for each block, so that the data is transmitted in a state where a changed minimum value of the total amount of data to be transmitted for each block is secured.

The above objects of the present invention are also achieved by a data transmission apparatus operatively connected to another data transmission apparatus for transmitting data in a state where a minimum value of a total amount of data to be transmitted for each block is secured, the data for each block including effective data, the transmission apparatus comprising: storage means for storing the effective data out of the data received for each block by the transmission apparatus; processing means for processing the effective data read out from the storage means; determination means for determining, based on an amount of effective data which has not yet been processed and remains in the storage means, whether or not the minimum value of the total amount of data to be transmitted for each block can be changed; and signal output means, when the determination means determines that the minimum value of the total amount of data to be transmitted for each block can be changed, for outputting a request signal, the request signal being transmitted to another data transmission apparatus operatively connected to the data transmission apparatus.

The above objects of the present invention are also achieved by a data transmission apparatus for transmitting data to another data transmission apparatus in a state where a minimum value of a total amount of data to be transmitted for each block is secured, the data for each block including effective data, the data transmission apparatus comprising: detecting means for detecting a request signal from another data transmission apparatus, the request signal indicating that the minimum value of the amount of data to be transmitted for each block is changed; and changing means, when the detecting means detects the request signal, for changing the minimum value of the total amount of data to be transmitted for each block, so that the data is transmitted in a state where a changed minimum value of the total amount of data to be transmitted for each block is secured.

According to the present invention, the minimum value of the total amount of data to be transmitted for each scanning line can be changed in accordance with an amount of image data which has not yet been used for printing and remains in the memory. Thus, waste fill bits can be prevented from being added to image data for each scanning line without increasing the capacity of the memory provided in a receiver.

Additional objects, features and advantages of the present invention will become apparent from the following detailed description when read in conjunction with the accompanying drawings.

DESCRIPTION OF THE PREFERRED EMBODIMENTS

A description will be given, with reference to FIG. 3, of the principle of a data communication system according to an embodiment of the present invention.

Figure 1A:
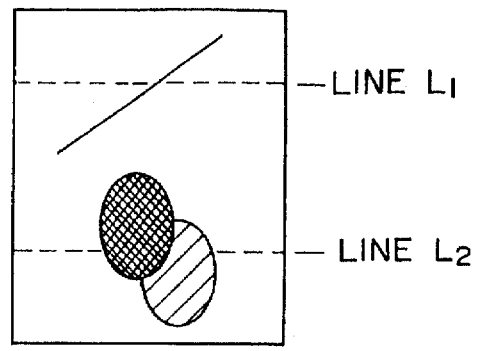
FIG. 1A is a diagram illustrating images formed on a document to be scanned in a transmitter side facsimile machine.
Figure 1B:
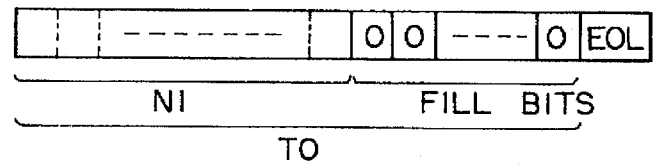
FIG. 1B is a diagram illustrating data formed of image data and fill bits, the data being transmitted as data for one line.
Figure 1C:
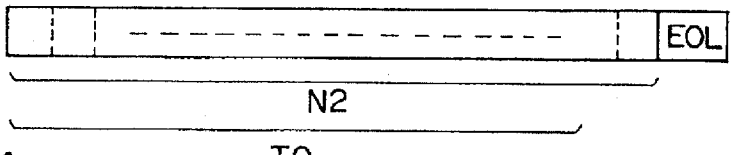
FIG. 1C is a diagram illustrating image data for one line, an amount of the image data being greater than an amount of data corresponding to the minimum transmission time T0.
Figure 2:
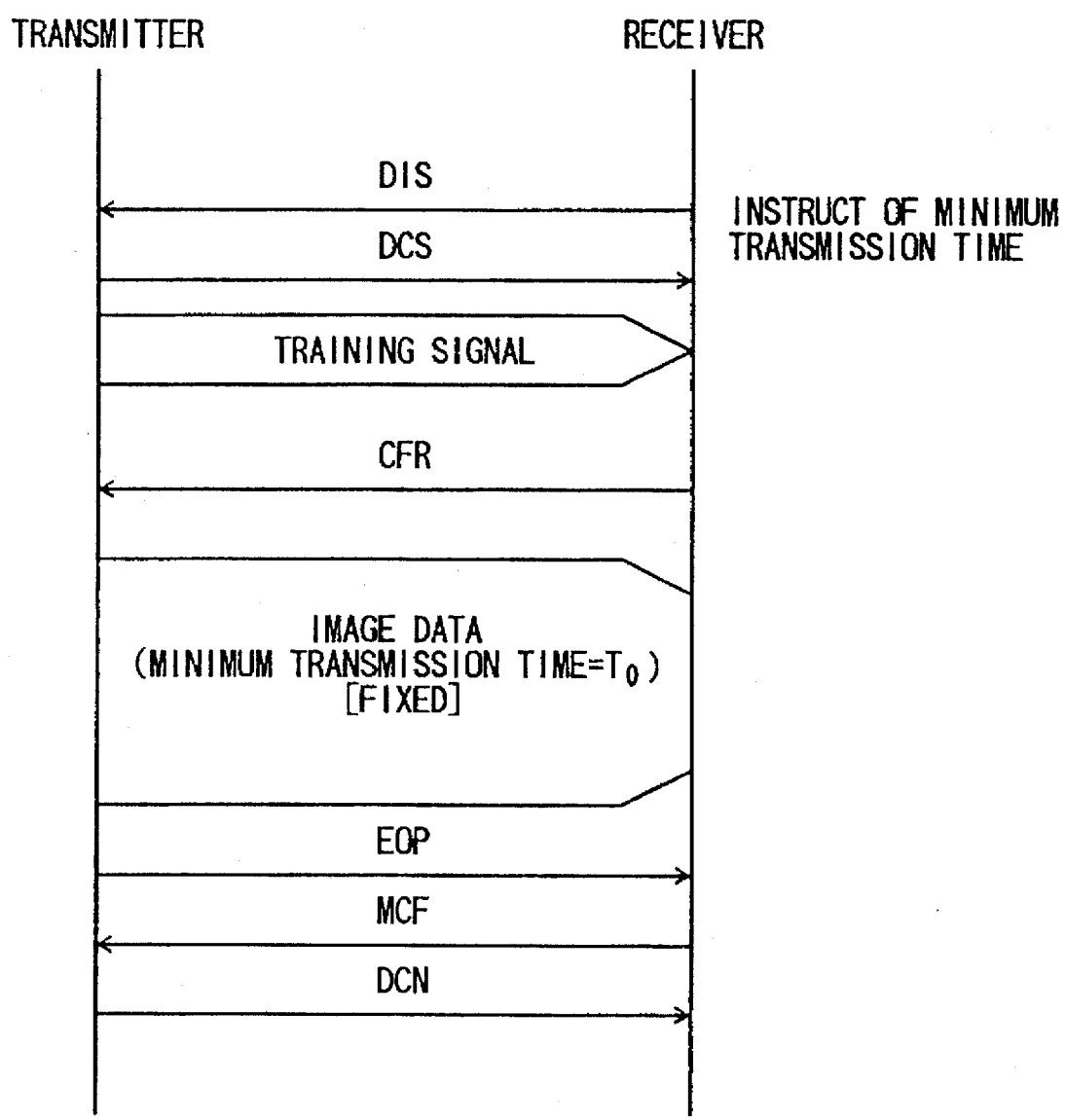
FIG. 2 is a diagram illustrating a procedure for communication between a transmitter and a receiver.
Figure 3:
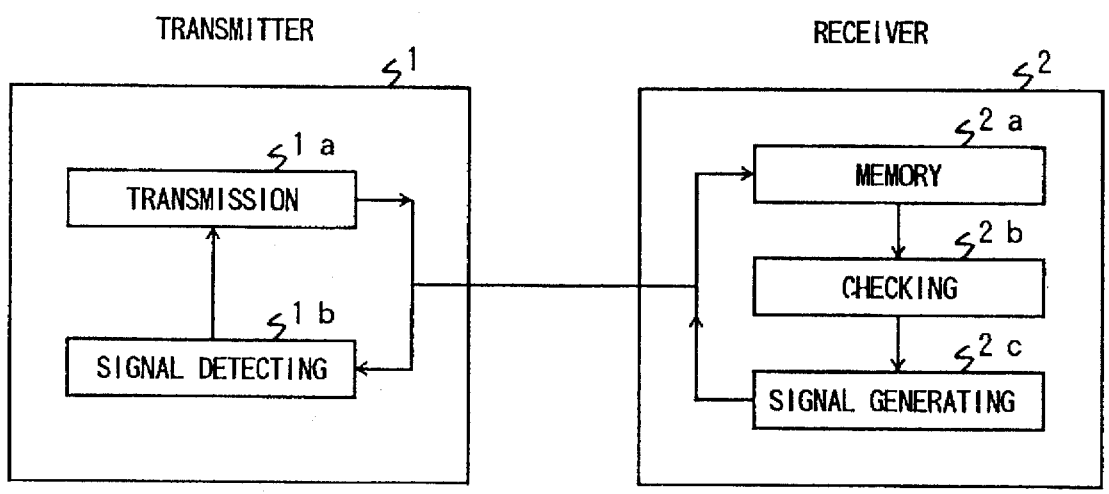
FIG. 3 is a block diagram illustrating the principle of a data communication system according to an embodiment of the present invention.

Referring to FIG. 3, a transmitter 1 and a receiver 2 are connected to a line so that image data communication is carried out between the transmitter 1 and the receiver 2. The transmitter 1 has a transmitting portion 1a and a signal detecting portion 1b for detecting a changing request signal representing a changing request of the minimum transmission time T0. The receiver 2 has a memory 2a, a checking portion 2b and a signal generating portion 2c. The memory 2a is used to store the image data transmitted from the transmitter 1. The checking portion 2b checks whether or not the amount of image data stored in the memory 2a has reached a predetermined amount. The signal generating portion 2c generates the changing request signal. In an actual system, each facsimile machine (an image data transmission apparatus) has functions of both the transmitter 1 and the receiver 2, and the communication is carried out between two facsimile machines. Thus, in FIG. 3, the transmitter 1 corresponds to a transmission function of a facsimile machine, and the receiver 2 corresponds to a receiving function of another facsimile machine.

In a transmission/receiving operation of commands in accordance with a communication procedure after the transmitter 1 and the receiver 2 are operatively connected to each other, the receiver 1 requests of the transmitter 2 that a variable mode in which the minimum transmission time T0 is variable is set, so that the variable mode for the control of the minimum transmission time is set in the transmitter 1. In the variable mode, a first mode or a second mode may be selected. in the first mode, fill bits are added to image data for each scanning line so that the data for each scanning line is equal to the amount of data corresponding to a standard minimum transmission time. In the second mode, no fill bits are added to image data for each scanning line.

After the transmission/receiving commands prior to the communication of image data and operations based on the training signal are completed, image data is transmitted from the transmitter 1 line by line under a condition in which the standard minimum transmission time T0 is secured or endured (the first mode). When the receiver 2 receives image data, the fill bits are eliminated from the received image data and image data (effective data) without the fill bits is stored in the memory 2. The image data is supplied to a printer unit (not shown), and images corresponding to the image data are printed by the printer unit line by line. That is, while the image data is being written in the memory 2a line by line, the image data is read out from the memory 2a line by line. In this state, the checking portion 2b checks the amount of image data (which has not yet been printed) stored in the memory 2a. When the checking portion 2b determines that the amount of image data stored in the memory 2a is less than a predetermined amount, the checking portion 2b activates the signal generating portion 2c. As a result, the signal generating portion 2c outputs a first changing request signal representing that the minimum transmission time T0 is decreased. The first changing request signal output from the signal generating portion 2c is transmitted to the transmitter 1 via the line. When the signal detecting portion 1b detects the first changing request signal, a detection signal is supplied to the transmitting portion 1a. In the transmitting portion 1a, in response to the detection signal corresponding to the first changing request signal, the minimum transmission time is changed from the standard value, for example, to a value of "0". As a result, no fill bits are added to image data for each line, and the image data is transmitted from the transmitter portion 1a line by line (the second mode).

In the second mode, image data transmitted to the receiver 2 is stored in the memory 2a line by line, so that the amount of image data stored in the memory 2a is increased. When the checking portion 2b determines that the amount of image data has reached a predetermined amount, the checking portion 2b activates the signal generating portion 2c. As a result, the signal generating portion 2c outputs a second changing request signal representing that the minimum transmission time is increased. The second changing request signal output from the signal generating portion 2c is transmitted to the transmitter 1 via the line. When the signal detecting portion 1b detects the second changing request signal, a detection signal is supplied to the transmitting portion 1a. In the transmitting portion 1a, in response to the detection signal corresponding to the second changing request signal, the minimum transmission time is changed from the value of "0" to the standard value. As a result, the image data is transmitted from the transmitter 1 to the receiver under the condition in which the standard minimum transmission time is secured by addition of the fill bits to image data.

A description will now be given of an embodiment of the present invention.

Figure 4:
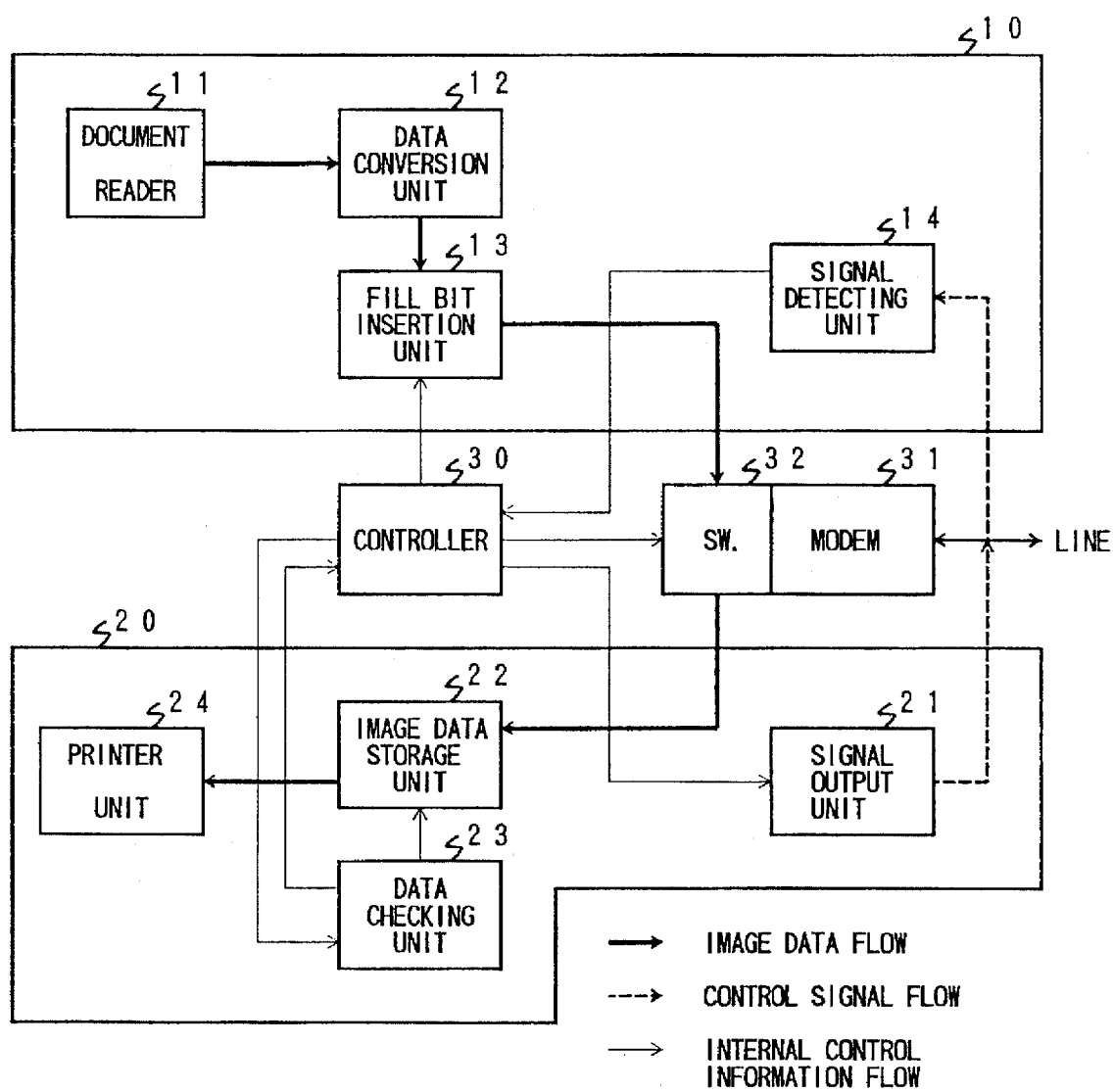
FIG. 4 is a block diagram illustrating a facsimile machine provided in the data communication system according to the embodiment of the present invention.

FIG. 4 shows an essential structure of a facsimile machine provided in a data communication system according to the embodiment of the present invention. Referring to FIG. 4, a facsimile machine has a transmitter unit 10, a receiver unit 20, a controller 30, a modem 31 and an input/output switching unit 32. The modem 31 modulates image data to be transmitted and demodulates data (facsimile signals) supplied from a telephone line. The input/output switching unit 32 carries out a switching operation in which signal received by the modem 31 is directed to the receiver unit 20 or image data to be transmitted from the transmitter unit 10 is directed the modem 31.

The transmitter unit 10 has a document reader 11, a data conversion unit 12, a fill bit insertion unit 13, and a signal detecting unit 14. The document reader 11 scans a document on which images are formed line by line and supplies image signals to the data conversion unit 12. The data conversion unit 12 converts the image signals into digital signals and codes the digital signals into compressed image data (e.g. run length data) (hereinafter referred to as image data). The image data is supplied from the data conversion unit 12 to the fill bit insertion unit 13. The fill bit insertion unit 13 is controlled by the controller 30. When the amount of image data for a scanning line supplied to the fill bit insertion unit 13 is less than the amount of data corresponding to the minimum transmission time set in the transmission unit 10 at this time, the fill bit insertion unit 13 adds fill bits to the image data so that the total amount of data for the scanning line is equal to the amount of data corresponding to the minimum transmission time. Hereinafter, the amount of data corresponding to the minimum transmission time is referred to as a minimum amount of data. The image data for each line is supplied to the modem 31 via the input/output switching unit 32, and the image data is modulated by the modem 31. The signal detecting unit 14 detects a changing request signal (a plurality of types of changing request signals existing) transmitted from a called facsimile machine via the telephone line. A detecting signal output from the signal detecting unit 14 is supplied to the controller 30.

The receiving unit 20 has a signal output unit 21, an image data storage unit 22, a data checking unit 23 and a printer unit 24. Received data demodulated by the modem 31 is supplied to the image data storage unit 22 via the input/output switching unit 32. If the received data includes fill bits, the fill bits are removed from the received data so that only the image data is supplied to the image data storage unit 22. The image data is then temporarily stored in the image data storage unit 22, and the image data is transferred from the image data storage unit 22 to the printer unit 24 line by line. The printer unit 24 carries out a printing operation using the image data supplied from the image data storage unit 22 so that images are formed on a printing sheet line by line. The data checking unit 23 checks the amount of image data remaining in the image data storage unit 22, and informs the controller 30 of the checking result. The controller 30 outputs a changing control signal depending on the checking result supplied from the data checking unit 23. The changing control signal is supplied to the signal output unit 21, and the signal output unit 21 outputs a changing request signal representing that the value of the minimum transmission time is changed. The changing request signal is an audio signal having a frequency different from frequencies used by the modem 31.

Figure 5:
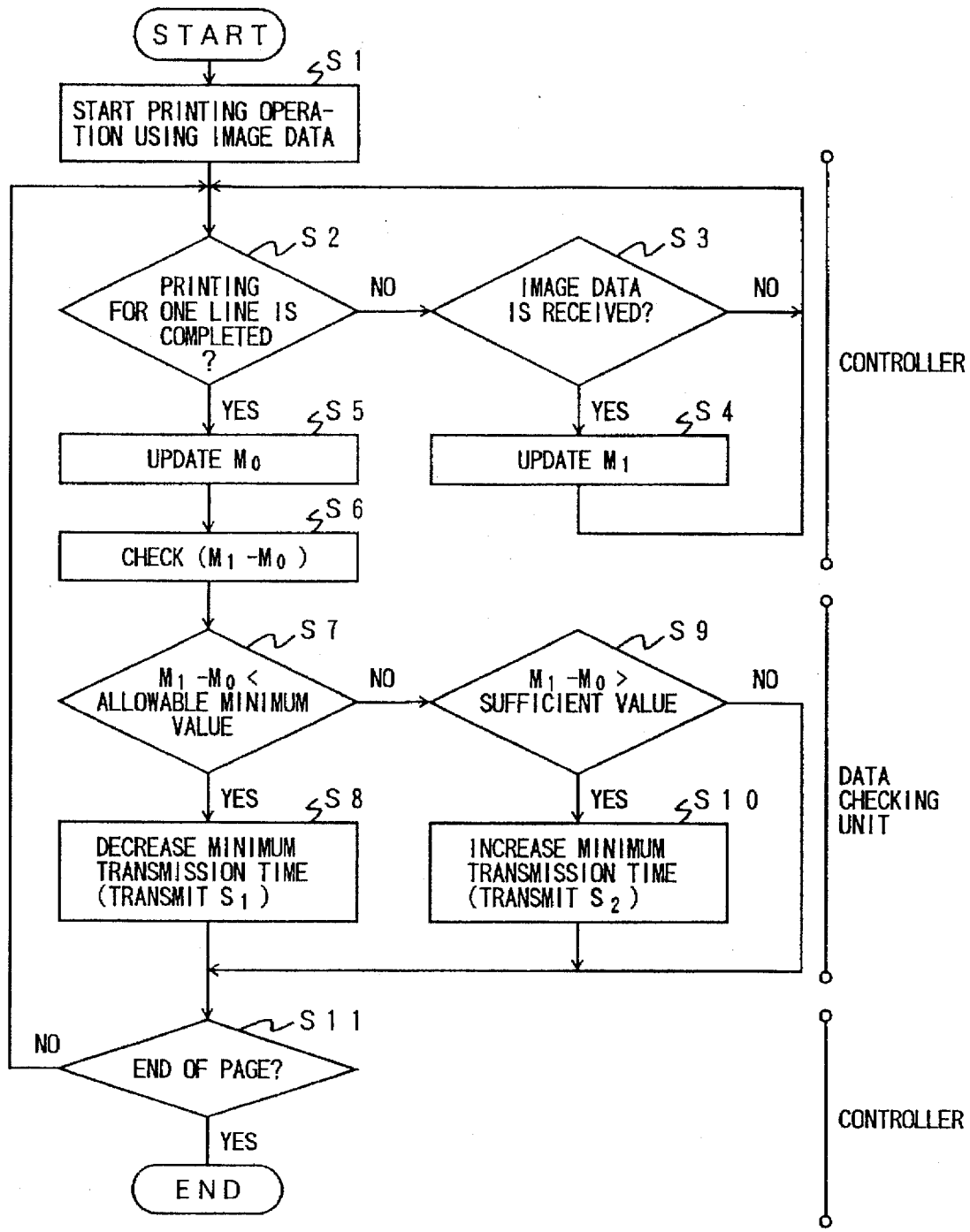
FIG. 5 is a flow chart illustrating a receiving operation in the facsimile machine.

A receiving process is carried out in accordance with a flow chart shown in FIG. 5 by the receiving unit 20 and the controller in the receiving side facsimile machine. In this embodiment, the facsimile machines can be communicated with each other in a first mode and in a second mode. In the first mode, the minimum transmission time is set at a standard value T0, and in the second mode, the minimum transmission time is set at a value of "0". When the minimum transmission time is set at the value of "0", however small the amount of image data for a line is, no fill bits are added to the image data.

Figure 6:
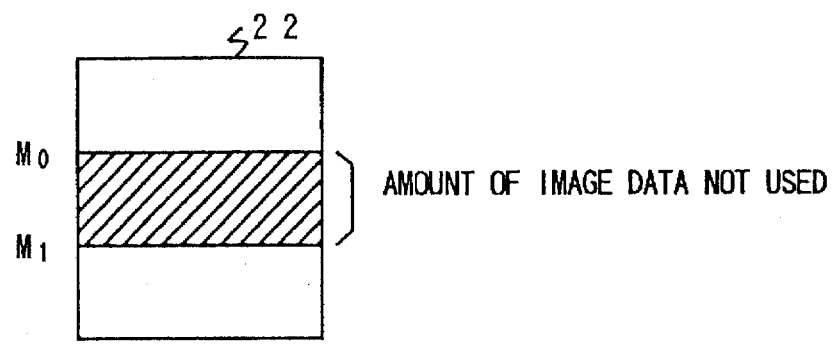
FIG. 6 is a diagram illustrating a state of a temporary image memory.

Referring to FIG. 5, when received image data is stored in the image data storage unit 22, the printer unit 24 starts the printing operation using the received image data, in step S1. After this, it is determined, in step S2, whether or not the printing operation for a scanning line is completed. If the printing operation for the scanning line has not yet been completed, it is determined, in step S3, whether or not the image data for a scanning line has been completely received. If the image data for the scanning line has been completely received, an M1 pointer is incremented by one in step S4. The M1 pointer indicates a current address M1 at which image data which has been received last and has not yet been used for printing is stored, as shown in FIG. 6. That is, in step S4, the current address M1 is updated. On the other hand, if it is determined, in step S2, that the printing operation for the scanning line is completed, an M0 pointer is incremented by one, in step S5. The M0 pointer indicates a current address M0 from which image data has been read out last to use it for the printing. That is, in step S5, the current address M0 is updated. Both the M1 pointer and the M0 pointer are provided in the data checking unit 23 and are controlled by the controller 30 so as to be incremented (updated).

When the current address M0 for the image data which has been used for the printing is updated, the data checking unit 23 calculates a residual amount (M1−M0) of image data, in the data storage unit 22, which has been received and has not yet been used for the printing, in step S6. It is then determined, in step S7, whether or not the residual amount (M1−M0) is less than an allowable minimum value. If the residual amount (M1−M0) of image data is less than the allowable minimum value, the data checking unit 23 instructs the controller 30 that the minimum transmission time is to be decreased, in step S8. The allowable minimum value is determined based on a minimum value of the residual amount of image data in the data storage unit 22, which minimum value can secure the printing operation continuously performed under a condition in which image data for each line is supplied to the data storage unit 22 at a rate corresponding to the standard value T0 of the minimum transmission time. Thus, if the residual amount of the image data in the data storage unit 22 is less than the allowable minimum value, the printing operation will be interrupted for lack of image data to be supplied to the printer unit 24.

Figure 7A:
FIG. 7A is a diagram illustrating a transmission operation for a changing request signal.

In response to the instruction from the data checking unit 23, the controller 30 supplies a control signal to the signal output unit 21 so that signal output unit 21 outputs a first changing request signal S1 which is, for example, a tone signal having a frequency of 2100 Hz. That is, the signal output unit 21 outputs the tone signal for a predetermined time, as shown in FIG. 7A.

Figure 7B:
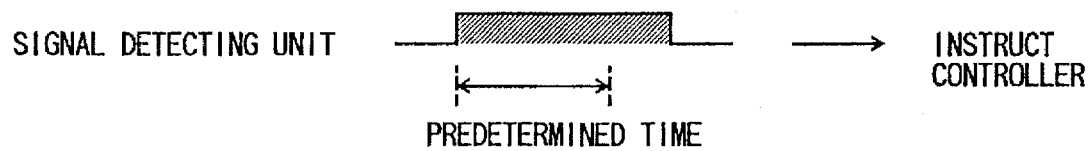
FIG. 7B is a diagram illustrating a detecting operation for the changing request signal.

On the other hand, if it is determined, in step S7, that the residual amount (M1−M0) of image data in the image data storage unit 22 is not less than the allowable minimum value, it is then determined, in step S9, whether or not the residual amount (M1−M0) of image data is greater than a sufficient value. The sufficient value is determined based on an upper limit value of the residual amount of image data in the image data storage unit 22. If the residual amount of image data in the image data storage unit 22 exceeds the upper limit value, image data is going to overflow the image data storage unit 22 during the printing operation under a condition in which image data for each line is supplied to the image data storage unit 22 at a rate corresponding to the minimum transmission time of "0". Thus, if it is determined, in step S9, that the residual amount (M1−M0) of image data in the image data storage unit 22 is greater than the sufficient value, the data checking unit 23 instructs the controller that the minimum transmission time is to be increased, in step S10. In response to the instruction from the data checking unit 23, the controller 30 supplies a control signal to the signal output unit 21 so that the signal output unit 21 outputs a second changing request signal S2 which is, for example, a tone signal having a frequency of 1100 Hz. The tone signal of the second changing request signal is output for the predetermined time, as shown in FIG. 7B, in the same manner as the first changing request signal.

After the above process, the controller 30 determines, in step S11, whether or not the printing operation for one page has been completed. If the printing operation for one page has not been completed yet, the above processes are repeated. On the other hand, if it is determined, in step S11, the printing operation for one page has been completed, the receiving process for a page is completed. The tone signals having frequencies of 2100 Hz and 1100 Hz which are respectively used as the first and second changing request signals are defined in the international standard (CCITT Recommendation T.3) regarding procedure controls in facsimile terminals, but are not used in controls under G3 standard.

Figure 8:
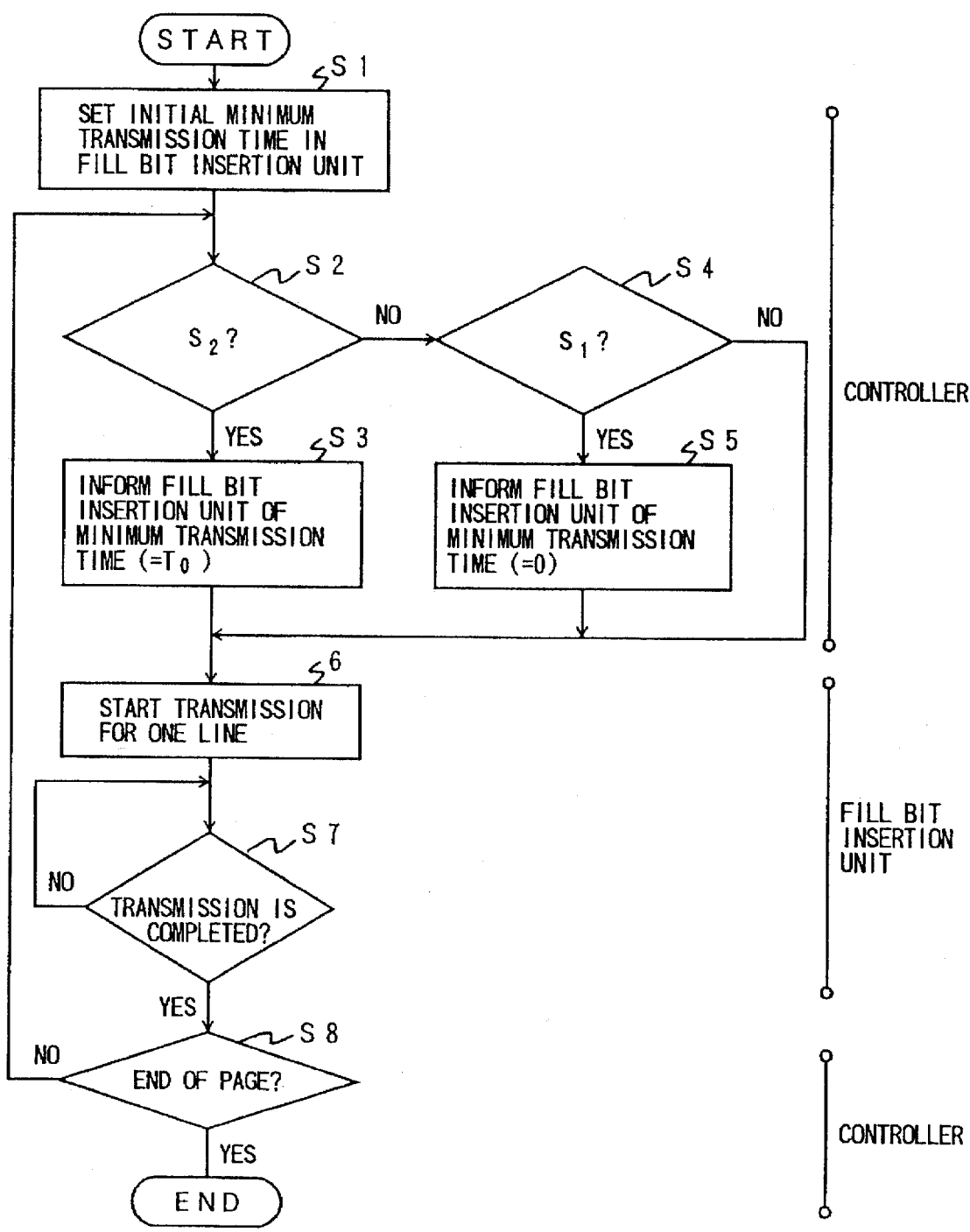
FIG. 8 is a flow chart illustrating a transmission operation in the facsimile machine.

A transmission process is performed in accordance with a flow chart shown in FIG. 8 by the transmission unit 10 and the controller 30 in the transmission side facsimile machine.

Referring to FIG. 8, in step S1, the minimum transmission time is initially set at the standard value T0, in the fill bit insertion unit 13, which value has been informed by the receiver side facsimile machine. It is then determined, in step S2, whether or not the second changing request signal S2 representing that the minimum transmission time is to be increased is detected by the signal detecting unit 14. If the signal detecting unit 14 detects the second changing request signal S2, the controller 30 instructs the fill bit insertion unit 13, in step S3, that the minimum transmission time is changed from the value of "0" to the standard value T0 so that the value of the minimum transmission time is increased. On the other hand, if it is determined, in step S2, that the second changing request signal S2 is not detected by the signal detecting unit 14, it is determined, in step S4, whether or not the first changing request signal S1 representing that the minimum transmission time is to be decreased is detected by the signal detecting unit 14. If the first changing request signal S1 is detected by the signal detecting unit 14, the controller 30 instructs the fill bit insertion unit 13, in step S5, that the minimum transmission time is changed from the standard value T0 to the value of "0" so that the value of the minimum transmission time is decreased. When the signal detecting unit 13 is receiving the tone signal for a predetermined time, the signal detecting unit 13 detects a corresponding (first or second) signal changing request signal.

After step S3 or S5, or in a case where neither the first changing request signal nor the second changing request signal is detected by the signal detecting unit 14, an image data transmission operation for a scanning line starts, in step S6. In the image data transmission operation in a state where the standard value T0 of the minimum transmission time is set in the fill bits insertion unit 13, if the amount of image data for the scanning line is less than the amount of data corresponding to the standard value T0 of the minimum transmission time, the fill bits insertion unit 13 adds fill bits to the image data so that the amount of data for the scanning line is equal to the amount of data corresponding to the standard value T0 of the minimum transmission time. On the other hand, in the image data transmission operation in a state where the minimum transmission time is set at the value of "0" in the fill bit insertion unit 13, no fill bits are added to the image data for each scanning line by the fill bit insertion unit 13.

After the image data transmission operation for a scanning line starts, it is determined, in step S7, whether or not the image data transmission operation for the scanning line is completed. If the image data transmission operation for the scanning line is completed, it is then determined, in step S8, whether or not the image data transmission operation for one page. After this, the above process is repeated until it is determined, in step S8, that the image data transmission operation for one page is completed. As a result, image data for one page supplied from the fill bit insertion unit 13 to the modem 31 via the input/output switching unit 32 is transmitted, line by line, from the modem 31 to the receiver side facsimile machine via the telephone line.

Figure 9:
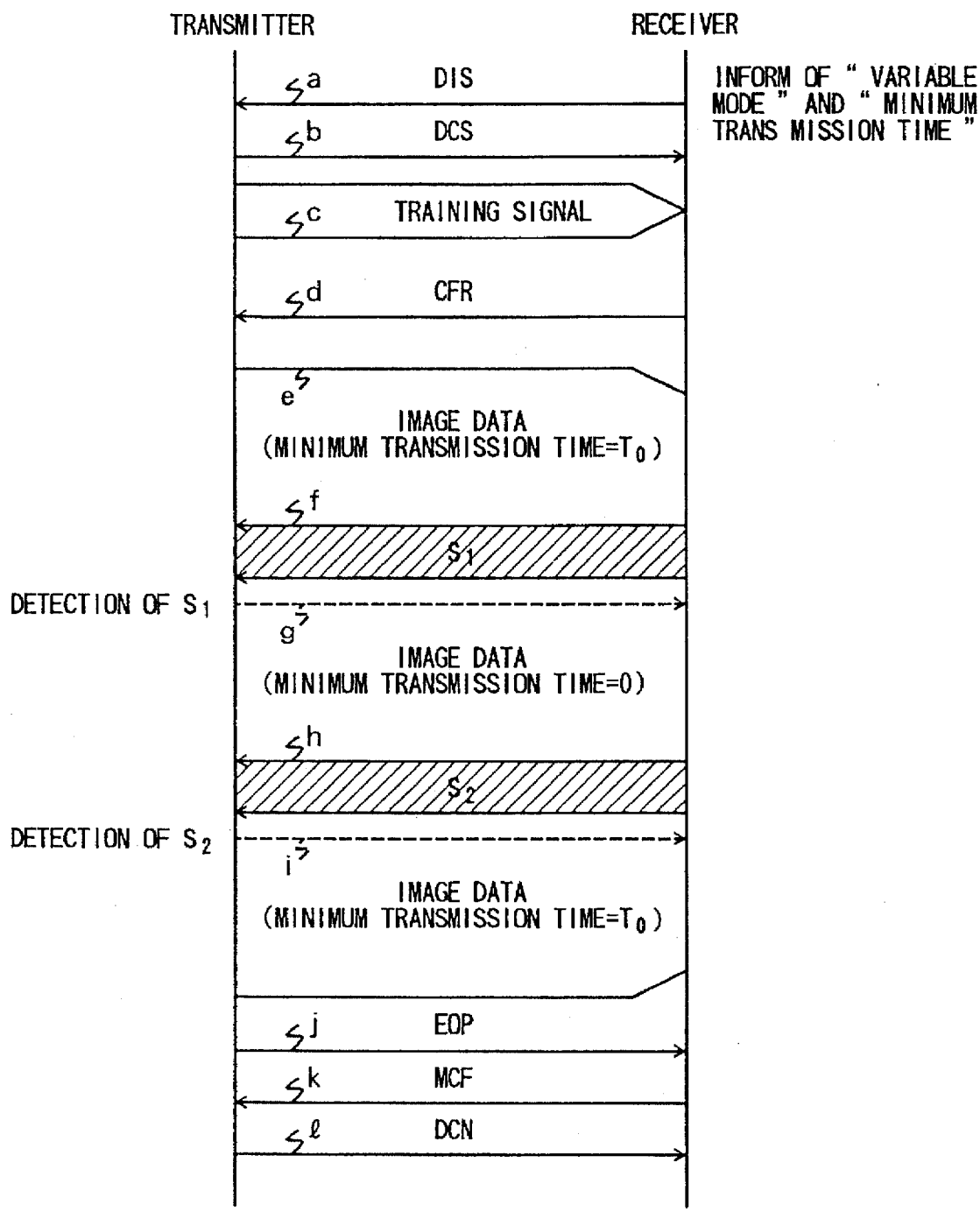
FIG. 9 is a diagram illustrating a procedure for communication between a transmitter and a receiver in the data transmission system according to the embodiment of the present invention.

The image data communication is performed, in accordance with a procedure as shown in FIG. 9, between a receiver side facsimile machine (referred to as a receiver) in which the function shown in FIG. 5 is activated and a transmitter side facsimile (referred to as a transmitter) in which the function shown in FIG. 8 is activated.

Referring to FIG. 9, first, the receiver transmits the DIS command to the transmitter fin the same as in the conventional case (a). At this time the receiver informs the transmitter that the receiver can operate in the variable mode in which the minimum transmission time is variable and the minimum transmission time is set, as the initial value, at the standard value T0. In response to the information from the receiver, the variable mode is set in the transmitter. After this, the DCS command, the training signal and the CFR command are passed between the transmitter and the receiver in the same manner as in the conventional case (b-d). Image data is then transmitted from the transmitter to the receiver line by line in a state where the minimum transmission time is secured at the standard value T0 (e). The receiver checks the residual amount of data which has been stored in the storage unit and has not been used for the printing yet. When in the receiver, it is determined, based on the residual amount of image data stored in the storage unit 22, that the image data without fill bit can be received (step S7 in FIG. 5), the receiver transmits the first changing request signal S1 to the transmitter (f). As a result, the transmitter transmits the image data without fill bit to the receiver in a mode in which the minimum transmission time is set to the value of "0" (g). After this, in the receiver, the residual amount of image data in the storage unit 22 is increased. When it is determined that the residual amount of the image data exceeds the sufficient value (in step S9 shown in FIG. 5), the receiver transmits the second changing request S2 representing that the minimum transmission time is changed from the value of "0" to the standard value T0 (h). When the transmitter detects the second changing request signal S2, the minimum transmission time is set at the standard value T0 which was initially informed by the receiver using the DIS command. After this, if the amount of image data for a scanning line is less than the amount of data corresponding to the standard value T0 of the minimum transmission time, fill bits are added to the image data so that the total amount of data for the scanning line is equal to the amount of data corresponding to the standard value T0 of the minimum transmission time.

The present invention is not limited to the aforementioned embodiments, and variations and modifications may be made without departing from the scope of the claimed invention.

What is claimed is:

1. A data communication system comprising:
    a transmitter for transmitting data in a state where an amount of data to be transmitted for each block is not less than a minimum value of a total amount of data to be transmitted for each block, and where the data to be transmitted for each block includes data from which fill bits are eliminated; and
    a receiver, operatively connected to said transmitter, for receiving the data transmitted from said transmitter,
    said receiver comprising:
        storage means for storing said data from which fill bits have been eliminated out of the data received for each block by said receiver;
        processing means for processing the data from which fill bits are eliminated, read out from said storage means;
        determination means for determining, based on an amount of said data from which fill bits are eliminated and which has not yet been processed and remains in said storage means, whether or not the minimum value of the total amount of data to be transmitted for each block can be changed; and
        signal output means for outputting, when said determination means determines that the minimum value of the total amount of data to be transmitted for each block can be changed, a request signal, the request signal being transmitted to said transmitter,
    said transmitter comprising:
        detecting means for detecting the request signal from said receiver; and
        changing means for changing, when said detecting means detects the request signal, the minimum value of the total amount of data to be transmitted for each block, so that the data is transmitted in a state where a changed minimum value of the total amount of data to be transmitted for each block is ensured.

2. The data communication system as claimed in claim 1, wherein the minimum value of the total amount of data to be transmitted for each block is determined based on a processing speed at which the data from which fill bits are eliminated is processed by said processing means of said receiver.

3. The data communication system as claimed in claim 1, wherein said determination means of said receiver has at least first means for determining whether or not the minimum value of the total amount of data to be transmitted for each block can be decreased, said signal output means outputting a first request signal when said first means determines that the minimum value of the total amount of data to be transmitted for each block can be decreased, and wherein said changing means of said transmitter has decreasing means for decreasing the minimum value of the total amount of data to be transmitted for each block when said detecting means detects the first request signal from said receiver.

4. The data communication system as claimed in claim 3, wherein said decreasing means has means for setting the minimum value of the total amount of data to be transmitted for each block at zero so that only the data from which fill bits are eliminated is transmitted for each block by said transmitter.

5. The data communication system as claimed in claim 3, wherein said determination means of said receiver has second means for determining whether or not the minimum value of the total amount of data to be transmitted for each block must be increased, said signal output means outputting a second request signal when said second means determines that the minimum value of the total amount of data to be transmitted for each block must be increased, and wherein said changing means of said transmitter has increasing means for increasing the minimum value of the total amount of data to be transmitted for each block when said detecting means detects the second request signal from said receiver.

6. The data communication system as claimed in claim 5, wherein said decreasing means of the transmitter has means for setting the minimum value of the total amount of data to be transmitted for each block at a first value, and said increasing means has means for setting the minimum value of the total amount of data to be transmitted for each block at a second value greater than the first value.

7. The data communication system as claimed in claim 5, wherein the first request signal is a tone signal having a first frequency and the second request signal is a tone signal having a second frequency different from the first frequency.

8. The data communication system as claimed in claim 5, wherein said first means has means for determining whether or not the amount of data from which fill bits are eliminated, which has not yet been processed and remains in said storage means is less than a first reference value, and when said means determines that the amount of data from which fill bits are eliminated, which has not yet been processed and remains in said storage means is less than the first reference value, said first means determines that the minimum value of the total amount of data to be transmitted for each block can be decreased, and wherein said second means has means for determining whether or not the amount of data from which fill bits are eliminated, which has not yet been processed and remains in said storage means is greater than a second reference value, and when said means determines that the amount of data from which fill bits are eliminated, which has not yet been processed and remains in said storage means is greater than the second reference value, said second means determines that the minimum value of the total amount of data to be transmitted for each block must be increased.

9. The data communication system as claimed in claim 3, wherein the first request signal is a tone signal having a predetermined frequency.

10. The data communication system as claimed in claim 3, wherein said first means has means for determining whether or not the amount of data from which fill bits are eliminated, which has not yet been processed and remains in said storage means is less than a first reference value, and when said means determines that the amount of data from which fill bits are eliminated, which has not yet been processed and remains in said storage means is less than the first reference value, said first means determines that the minimum value of the total amount of data to be transmitted for each block can be decreased.

11. A data transmission apparatus operatively connected to another data transmission apparatus for transmitting data in a state where an amount of data to be transmitted for each block is not less than a minimum value of a total amount of data to be transmitted for each block, and the data to be transmitted for each block includes data from which fill bits are eliminated, said data transmission apparatus comprising:

storage means for storing said data from which fill bits have been eliminated out of the data received for each block by said transmission apparatus;

processing means for processing the data from which fill bits are eliminated, read out from said storage means;

determination means for determining, based on an amount of data from which fill bits are eliminated, which has not yet been processed and remains in said storage means, whether or not the minimum value of the total amount of data to be transmitted for each block can be changed; and signal output means for outputting, when said determination means determines that the minimum value of the total amount of data to be transmitted for each block can be changed, a request signal, the request signal being transmitted to another data transmission apparatus operatively connected to said data transmission apparatus.

12. The data transmission apparatus as claimed in claim 11, wherein the minimum value of the total amount of data to be transmitted for each block is determined based on a processing speed at which the data from which fill bits are eliminated is processed by said processing means.

13. The data transmission apparatus as claimed in claim 11, wherein said determination means has at least first means for determining whether or not the minimum value of the total amount of data to be transmitted for each block can be decreased, said signal output means outputting a first request signal when said first means determines that the minimum value of the total amount of data to be transmitted for each block can be decreased.

14. The data transmission apparatus as claimed in claim 13, wherein said determination means has second means for determining whether or not the minimum value of the total amount of data to be transmitted for each block must be increased, said signal output means outputting a second request signal when said second means determines that the minimum value of the total amount of data to be transmitted for each block must be increased.

15. The data transmission apparatus as claimed in claim 14, wherein said first means has means for determining whether or not the amount of data from which fill bits are eliminated, which has not yet been processed and remains in said storage means is less than a first reference value, add when said means determines that the amount of data from which fill bits are eliminated, which has not yet been processed and remains in said storage means is less than the first reference value, said first means determines that the minimum value of the total amount of data to be transmitted for each block can be decreased, and wherein said second means has means for determining whether or not the amount of data from which fill bits are eliminated, which has not yet been processed and remains in said storage means is greater than a second reference value, and when said means determines that the amount of data from which fill bits are eliminated, which has not yet been processed and remains in said storage means is greater than the second reference value, said second means determines that the minimum value of the total amount of data to be transmitted for each block must be increased.

16. The data transmission apparatus as claimed in claim 14, wherein the first request signal is a tone signal having a first frequency and the second request signal is a tone signal having a second frequency different from the first frequency.

17. The data communication apparatus as claimed in claim 13, wherein said first means has means for determining whether or not the amount of data from which fill bits ate eliminated, which has not yet been processed and remains in said storage means is less than a first reference value, and when said means determines that the amount of data from which fill bits are eliminated, which has not yet been processed and remains in said storage means is less than the first reference value, said first means determines that the minimum value of the total amount of data to be transmitted for each block can be decreased.

18. The data transmission apparatus as claimed in claim 13, wherein the first request signal is a tone signal having a predetermined frequency.

19. A data transmission apparatus for transmitting data to another data transmission apparatus in a state where an amount of data to be transmitted for each block is not less than a minimum value of a total amount of data to be transmitted for each block, and the data to be transmitted for each block includes data from which fill bits are eliminated, said data transmission apparatus comprising:

detecting means for detecting a request signal from another data transmission apparatus, the request signal indicating that the minimum value of the total amount of data to be transmitted for each block can be changed; and changing means for changing, when said detecting means detects the request signal, the minimum value of the total amount of data to be transmitted for each block, so that the data is transmitted in a state where a changed minimum value of the total amount of data to be transmitted for each block is ensured.

20. The data transmission apparatus as claimed in claim 19, wherein said request signal includes a first request signal representing that the minimum amount of the total amount of data to be transmitted for each block is decreased, and wherein said changing means has decreasing means for decreasing the minimum value of the total amount of data to be transmitted for each block when said detecting means detects the first request signal.

21. The data transmission apparatus as claimed in claim 20, wherein said decreasing means has means for setting the minimum value of the total amount of data to be transmitted for each block at zero so that only the data from which fill bits are eliminated is transmitted for each block.

22. The data transmission apparatus as claimed in claim 20, wherein the request signal includes a second request signal representing that the minimum value of the total amount of data to be transmitted for each block must be increased, and wherein said changing means has increasing means for increasing the minimum value of the total amount of data to be transmitted for each block when said detecting means detects the second request signal.

23. The data transmission apparatus as claimed in claim 22, wherein said decreasing means has means for setting the minimum value of the total amount of data to be transmitted for each block at a first value, and said increasing means has means for setting the minimum value of the total amount of data to be transmitted for each block at a second value greater than the first value.

24. A facsimile machine comprising:

a transmitter unit for transmitting data in a state where an amount of data to be transmitted for each scanning line is not less than a minimum value of a total amount of data to be transmitted for each scanning line, and the data for each scanning line includes image data as data from which fill bits are eliminated; and a receiving unit for receiving data transmitted from another facsimile machine operatively connected to said facsimile machine, said receiving unit including:

storage means for storing the image data out of the data received for each scanning line by said receiving unit;

processing means for processing the image data read out from said storage means;

printing means for performing a printing operation of the image data read out from said storage means and processed by said processing means;

determination means for determining, based on an amount of image data which has not yet been processed in said processing means and remains in said storage means, whether or not the minimum value of the total amount of data to be transmitted for each scanning line can be changed; and signal output means for outputting, when said determination means determines that the minimum value of the total amount of data to be transmitted for each scanning line can be changed, a request signal, the request signal being transmitted to another facsimile machine operatively coupled to said facsimile machine.

25. The facsimile machine as claimed in claim 24, wherein the minimum value of the total amount of data to be transmitted for each scanning line is determined based on a processing speed of said processing means and said printing means.

26. The facsimile machine as claimed in claim 24, wherein the minimum value of the total amount of data to be transmitted for each scanning line is defined as a minimum transmission time which is a minimum time having to be taken to transmit data for one scanning line to another facsimile machine.

27. The facsimile machine as claimed in claim 24, wherein said determination means of said receiving unit has at least first means for determining whether or not the minimum value of the total amount of data to be transmitted for each scanning line can be decreased, said signal output means outputting a first request signal when said first means determines that the minimum value of the total amount of data to be transmitted for each scanning line can be decreased.

28. The facsimile machine as claimed in claim 27, wherein said determination means of said receiving unit has second means for determining whether or not the minimum value of the total amount of data to be transmitted for each scanning line must be increased, said signal output means outputting a second request signal when said second means determines that the minimum value of the total amount of data to be transmitted for each scanning line must be increased.

29. The facsimile machine as claimed in claim 28, wherein said first means has means for determining whether or not the amount of image data which has not yet been processed and used for printing and remains in said storage means is less than a first reference value, and when said means determines that the amount of image data which has not yet been processed and used for printing and remains in said storage means is less than the first reference value, said first means determines that the minimum value of the total amount of data to be transmitted for each scanning line can be decreased, and wherein said second means has means for determining whether or not the amount of image data which has not yet been processed and used for printing and in said storage means is greater than a second reference value, and when said means determines that the amount of image data which has not yet been processed and used for printing and remains in said storage means is greater than the second reference value, said second means determines that the minimum value of the total amount of data to be transmitted for each scanning line must be increased.

30. The facsimile machine as claimed in claim 28, wherein the first request signal is a tone signal having a first frequency and the second request signal is a tone signal having a second frequency different from the first frequency, said first and second request signals being different from a frequency of a signal used to process the image data.

31. The facsimile machine as claimed in claim 27, wherein said first means has means for determining whether or not the amount of image data which has not yet been used for printing and remains in said storage means is less than a first reference value, when said means determines that the amount of image data which has not yet been used for printing and remains in said storage means is less than the first reference value, said first means determining that the minimum value of the total amount of data to be transmitted for each scanning line can be decreased.

32. The facsimile machine as claimed in claim 27, wherein the first request signal is a tone signal having a predetermined frequency different from a frequency of a signal used to process the image data.

33. A facsimile machine comprising:
a transmission unit for transmitting data in a state where an amount of data to be transmitted for each scanning line is not less than a minimum value of a total amount of data to be transmitted for each scanning line, and the data for each scanning line includes image data as data from which fill bits are eliminated; and
a receiving unit for receiving data transmitted from another facsimile machine operatively connected to said facsimile machine,
said transmission unit including:
    detecting means for detecting a request signal from another facsimile machine, the request signal indicating that the minimum value of the amount of data to be transmitted for each scanning line is changed; and
    changing means for changing, when said detecting means detects the request signal, the minimum value of the total amount of data to be transmitted for each scanning line, so that the data is transmitted in a state where a changed minimum value of the total amount of data to be transmitted for each scanning line is ensured.

34. The data transmission apparatus as claimed in claim 33, wherein said request signal includes a first request signal representing that the minimum amount of the total amount of data to be transmitted for each scanning line is decreased, and wherein said changing means has decreasing means for decreasing the minimum value of the total amount of data to be transmitted for each scanning line when said detecting means detects the first request signal.

35. The data transmission apparatus as claimed in claim 34, wherein said decreasing means has means for setting the minimum value of the total amount of data to be transmitted for each scanning line at zero so that only the image data is transmitted for each scanning line.

36. The data transmission apparatus as claimed in claim 34, wherein the request signal includes a second request signal representing that the minimum value of the total amount of data to be transmitted for each scanning line must be increased, and wherein said changing means has increasing means for increasing the minimum value of the total amount of data to be transmitted for each scanning line when said detecting means detects the second request signal.

37. The data transmission apparatus as claimed in claim 36, wherein said decreasing means has means for setting the minimum value of the total amount of data to be transmitted for each scanning line at a first value, and said increasing means has means for setting the minimum value of the total amount of data to be transmitted for each scanning line at a second value greater than the first value.

38. A data communication system comprising:
a transmitter for transmitting data in a state where an amount of data to be transmitted for each block is not less than a minimum value of a total amount of data to be transmitted for each block, the data to be transmitted for each block including data from which fill bits are eliminated; and
a receiver, operatively connected to said transmitter, for receiving the data transmitted from said transmitter,
said receiver comprising:
    storage means for storing the data from which fill bits are eliminated out of the data received for each block by said receiver;
    processing means for processing the data from which fill bits are eliminated, read out from said storage means;
    determination means for determining, based on an amount of data from which fill bits are eliminated and which has not yet been processed and remains in said storage means, whether or not the minimum value of the total amount of data to be transmitted for each block can be changed; and
    signal output means for outputting, when said determination means determines that the minimum value of the total amount of data to be transmitted for each block can be changed, a request signal, the request signal being transmitted to said transmitter,
said transmitter comprising:
    detecting means for detecting the request signal from said receiver; and
    changing means for changing, when said detecting means detects the request signal, the minimum value of the total amount of data to be transmitted for each block, so that the data is transmitted in a state where a changed minimum value of the total amount of data to be transmitted for each block is ensured;
    wherein said determination means of said receiver has at least first means for determining whether or not the minimum value of the total amount of data to be transmitted for each block can be decreased, said signal output means outputting a first request signal when said first means determines that the minimum value of the total amount of data to be transmitted for each block can be decreased, and wherein said changing means of said transmitter has decreasing means for decreasing the minimum value of the total amount of data to be transmitted for each block when said detecting means detects the first request signal from said receiver; wherein said decreasing means has means for setting the minimum value of the total amount of data to be transmitted for each block at zero so that only the data from which fill bits are eliminated is transmitted for each block by said transmitter.

* * * * *